US011556987B2

(12) United States Patent  
Lutnick et al.

(10) Patent No.: US 11,556,987 B2  
(45) Date of Patent: *Jan. 17, 2023

(54) TRADING APPLICATION PROGRAM INTERFACE

(71) Applicant: BGC PARTNERS, INC., New York, NY (US)

(72) Inventors: Howard W. Lutnick, New York, NY (US); Michael Sweeting, Aldershot (GB)

(73) Assignee: BGC PARTNERS, INC., New York, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/188,289

(22) Filed: Mar. 1, 2021

(65) Prior Publication Data

US 2021/0182971 A1 Jun. 17, 2021

Related U.S. Application Data

(63) Continuation of application No. 10/938,143, filed on Sep. 10, 2004, now Pat. No. 10,937,092, which is a
(Continued)

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC ..................................................... G06Q 40/04
See application file for complete search history.

(56) References Cited

U.S. PATENT DOCUMENTS

| 3,581,072 A | 5/1971 | Nymeyer |
| 4,677,552 A | 6/1987 | Sibley, Jr. |

(Continued)

FOREIGN PATENT DOCUMENTS

| CA | 2493971 | 6/1998 |
| CA | 2374586 | 12/2000 |

(Continued)

OTHER PUBLICATIONS

Nath et al: "High Frequency Pairs Trading with U.S. Treasury Securities: Risks and Rewards for Hedge Funds" London Business School, Regent's Park London NW1 4SA, United Kingdom. (Year: 2003).*

(Continued)

*Primary Examiner* — Edward J Baird

(57) ABSTRACT

An electronic trading system including various rules is described herein. Many of the rules relate to implementing periods of exclusive priority in trading. For example, in one of the rules, an exclusive period of trading may be controlled by an aggressor and a designated passive participant. The aggressor may have exclusive rights on his side of the trade at a particular price point for a particular time. The aggressor may elect to change the price point at which he controls the trade to a new price point which is more favorable to him. Thereafter, another participant may assume the exclusivity of the trade by entering the trade on the same side of the aggressor at the old price point. In so doing, the other participant also preferably truncates the aggressor's exclusivity at the new price point.

11 Claims, 8 Drawing Sheets

Related U.S. Application Data continuation-in-part of application No. 10/890,602, filed on Jul. 13, 2004, now abandoned.

(60) Provisional application No. 60/502,051, filed on Sep. 10, 2003, provisional application No. 60/512,879, filed on Oct. 20, 2003, provisional application No. 60/513,664, filed on Oct. 22, 2003.

(56) References Cited

U.S. PATENT DOCUMENTS

| | | | |
|---|---|---|---|
| 4,980,826 A | 12/1990 | Wagner | |
| 5,038,284 A | 8/1991 | Kramer | |
| 5,077,665 A | 12/1991 | Silverman et al. | |
| 5,168,446 A | 12/1992 | Wiseman | |
| 5,297,032 A | 3/1994 | Trojan et al. | |
| 5,787,402 A | 7/1998 | Potter et al. | |
| 5,802,499 A | 9/1998 | Sampson | |
| 5,835,896 A | 11/1998 | Fisher et al. | |
| 5,905,974 A | 5/1999 | Fraser et al. | |
| 5,905,975 A | 5/1999 | Ausubel | |
| 5,924,082 A | 7/1999 | Silverman et al. | |
| 5,926,801 A | 7/1999 | Matsubara et al. | |
| 6,134,535 A | 10/2000 | Belzberg | |
| 6,141,653 A | 10/2000 | Conklin et al. | |
| 6,317,727 B1 | 11/2001 | May | |
| 6,363,365 B1 | 3/2002 | Kou | |
| 6,519,574 B1 | 2/2003 | Wilton et al. | |
| 6,560,580 B1 | 5/2003 | Fraser et al. | |
| 6,618,707 B1 | 9/2003 | Gary | |
| 7,020,632 B1 | 3/2006 | Kohls et al. | |
| 7,155,410 B1 | 12/2006 | Woodmansey et al. | |
| 7,194,481 B1* | 3/2007 | Van Roon | G06Q 30/08 |
| 7,246,093 B1 | 7/2007 | Katz | |
| 7,251,629 B1 | 7/2007 | Marynowski | |
| 7,343,341 B2 | 3/2008 | Sandor et al. | |
| 7,379,909 B1 | 5/2008 | Cruz | |
| 7,392,214 B1 | 6/2008 | Fraser et al. | |
| 7,496,533 B1* | 2/2009 | Keith | G06Q 40/04 705/37 |
| 7,574,395 B2 | 8/2009 | Sweeting | |
| 7,685,048 B1* | 3/2010 | Hausman | G06Q 40/04 705/37 |
| 7,752,116 B2 | 7/2010 | Ascher et al. | |
| 8,019,672 B2 | 9/2011 | Sweeting et al. | |
| 8,108,295 B2 | 1/2012 | Bok et al. | |
| 8,229,831 B2 | 7/2012 | Fraser | |
| 8,301,540 B2 | 10/2012 | Lutnick et al. | |
| 2002/0052827 A1 | 5/2002 | Waelbroeck et al. | |
| 2002/0069155 A1* | 6/2002 | Nafeh | G06Q 40/04 705/37 |
| 2002/0077962 A1* | 6/2002 | Donato | G06Q 40/04 705/37 |
| 2002/0095369 A1 | 7/2002 | Kaplan et al. | |
| 2002/0116314 A1 | 8/2002 | Spencer et al. | |
| 2002/0169703 A1 | 11/2002 | Lutnick et al. | |
| 2002/0198816 A1 | 12/2002 | Gilbert et al. | |
| 2003/0033239 A1 | 2/2003 | Gilbert et al. | |
| 2003/0041010 A1 | 2/2003 | Yonao-Cowan | |
| 2003/0088495 A1 | 5/2003 | Gilbert | |
| 2003/0126066 A1 | 7/2003 | Nunes et al. | |
| 2003/0182230 A1* | 9/2003 | Pessin | G06Q 30/08 705/39 |
| 2003/0229563 A1 | 12/2003 | Moore et al. | |
| 2003/0229569 A1 | 12/2003 | Nalbandian et al. | |
| 2003/0233304 A1* | 12/2003 | Dhurandhar | G06Q 40/06 705/36 R |
| 2004/0210512 A1 | 10/2004 | Fraser | |
| 2004/0236669 A1 | 11/2004 | Horst et al. | |
| 2004/0243505 A1 | 12/2004 | Sweeting et al. | |
| 2004/0254804 A1 | 12/2004 | Peterffy et al. | |
| 2005/0038732 A1 | 2/2005 | Sweeting et al. | |
| 2005/0055304 A1 | 3/2005 | Lutnick et al. | |
| 2005/0055305 A1 | 3/2005 | Lutnick et al. | |
| 2005/0108125 A1 | 5/2005 | Goodwin et al. | |
| 2005/0125327 A1 | 6/2005 | Fishbain | |
| 2005/0216393 A1 | 9/2005 | Lutnick et al. | |
| 2006/0069635 A1 | 3/2006 | Ram et al. | |
| 2006/0069637 A1 | 3/2006 | Lutnick et al. | |
| 2008/0071670 A1 | 3/2008 | Fraser et al. | |
| 2008/0071671 A1 | 3/2008 | Fraser et al. | |
| 2008/0077523 A1 | 3/2008 | Fraser et al. | |
| 2009/0094136 A1 | 4/2009 | Ausubel | |
| 2009/0281954 A1 | 11/2009 | Waelbroeck et al. | |

FOREIGN PATENT DOCUMENTS

| | | |
|---|---|---|
| CA | 2521478 | 7/2017 |
| EP | 1006471 | 6/2000 |
| EP | 1006472 | 6/2000 |
| EP | 1256895 A1 | 11/2002 |
| WO | WO 00/26745 | 5/2000 |
| WO | WO 03/048905 | 6/2003 |
| WO | WO 2004/042514 | 5/2004 |

OTHER PUBLICATIONS

U.S. Appl. No. 60/513,664, filed Apr. 2000, Lutnick et al.
U.S. Appl. No. 60/512,879, filed Apr. 2000, Lutnick et al.
U.S. Appl. No. 60/502,051, filed Apr. 2000, Lutnick et al.
U.S. Appl. No. 60/613,830, filed May 2000, Lutnick et al.
Canadian Office Action for Application No. 2,521,478, dated Feb. 20, 2014 (2 pages).
Canadian Office Action for Application No. 2,521,478, dated Apr. 7, 2015 (3 pages).
Canadian Office Action for Application No. 2481185, dated Sep. 15, 2016 (6 pages).
Canadian Office Action for Application No. 2481185, dated Sep. 8, 2017 (6 pages).
Canadian Office Action for Application No. 2971774, dated Oct. 23, 2018 (4 pages).
USPTO Examiner's Answer for U.S. Appl. No. 10/890,602, dated Mar. 7, 2019 (15 pages).
Manaster et al: "Sources of Market Making Profits: Man Does Not Live by Spread Alone", Pamplin College of Business, Virginia Tech and Neeley School of Business, Texas Christian University, Feb. 1999 (Year: 1999).
International Search Report and Written Opinion for International Application No. PCT/US06/25410, dated May 29, 2008 (5 pages).
USPTO Office Action for U.S. Appl. No. 10/890,602, dated Aug. 5, 2008 (7 pages).
USPTO Petition Decision for U.S. Appl. No. 10/890602, dated Dec. 18, 2009 (3 pages).
USPTO Office Action for U.S. Appl. No. 10/890,602, dated Feb. 2, 2010 (19 pages).
USPTO Office Action for U.S. Appl. No. 10/938,143, dated Aug. 7, 2008 (7 pages).
USPTO Petition Decision for U.S. Appl. No. 10/938,143, dated Dec. 18, 2009 (3 pages).
USPTO Office Action for U.S. Appl. No. 10/938,143, dated Jan. 13, 2010 (16 pages).
International Preliminary Report on Patentability for International Application No. PCT/US06/25410, dated Jul. 1, 2008 (4 pages).
EPOA Supplementary Search Report and Opinion for European Application No. 06785863.9, dated Nov. 30, 2009 (3 pages).
EPO Communication for European Application No. 06785863.9, dated Mar. 30, 2010 (1 page).
Robert Battalio et al., "Does the Limit Order Routing Decision Matter?" Oxford University Press, vol. 15, No. 1, pp. 159-194 (Spring 2002).
EPO Communication and Search Report for European Application No. 04255492.3, dated Jul. 20, 2006 (5 pages).
European Supplementary Search Report for EP Application No. 06785863.9; dated Dec. 21, 2009 (5 pages).
AU Examination Report for Application No. 2006263658; dated Mar. 30, 2009 (2 pages).
Paul Laird, "MarkAir Comes of Age," Alaska Business Monthly, Anchorage, Oct. 1986, vol. 2, Iss. 10, Sec. 1, p. 28.

(56) References Cited

OTHER PUBLICATIONS

USPTO Examiner Interview Summary Record for U.S. Appl. No. 11/238,422, dated Mar. 21, 2011 (4 pages).
EPO Summons to Attend Oral Proceedings for European Application No. 04255492.3, dated Jul. 6, 2011 (6 pages).
USPTO Pre-Brief Appeal Conference Decision for U.S. Appl. No. 10/938,143, dated Jan. 24, 2012 (2 pages).
USPTO Advisory Action for U.S. Appl. No. 10/938,143, dated Feb. 7, 2012 (4 pages).
EPO Decision for European Application No. 04255492.3, dated Oct. 24, 2011 (4 pages).
USPTO Office Action for U.S. Appl. No. 10/890,602, dated Feb. 21, 2012 (5 pages).
Canadian Office Action for Application No. 2,521,478, dated Jul. 13, 2012 (4 pages).
USPTO Office Action for U.S. Appl. No. 10/890,602, dated Feb. 6, 2013 (13 pages).
USPTO Office Action for U.S. Appl. No. 10/890,602, dated Oct. 24, 2013 (14 pages).
Canadian Office Action for Application No. 2,481,185 dated Nov. 19, 2012 (3 pages).
Canadian Office Action for Application No. 2,481,185 dated Mar. 4, 2014 (4 pages).
Canadian Office Action for Application No. 2,481,185 dated Apr. 23, 2015 (7 pages).
USPTO Examiner's Answer for U.S. Appl. No. 10/938,143, dated May 21, 2013 (22 pages).

\* cited by examiner

| ITEM | MARKET | | LAST PRICE |
|---|---|---|---|
| 302 BOND A | 303  305 301 100.00+ — 100.012  106 x 74  306 304 99.31+ — 100.01+  50 x 50 99.31 — 100.02  100 x 50 310 | 312 5 1 100  314 2 22 50 | 100.00 308 |

FIG. 3

| ITEM | MARKET | LAST PRICE |
|---|---|---|
| BOND A ~402 | 100.00+ HIT (106) ~404    0 x 74 ~406 | 100.00 ~408 |
|  | 99.41+ — 100.01+   50 x 50     \[ 5 / 1 / 100 \] ~412<br>99.41   —  100.02    100 x 50    \[ 2 / 22 / 50 \] ~414<br>~410 |  |

FIG. 4

| | | MMTS PRICES | | | | | AVERAGE BID/ASK SPREAD | 0.75 TIC(S) | | ENTRY FIELD FOR CUSTOMER PORTFOLIO | | | ORDER FROM MARKET | -$35 |
|---|---|---|---|---|---|---|---|---|---|---|---|---|---|---|
| | | | | | | | | | | | | | AVERAGE TICS | -1.1 |
| ISSUE | BID | OFFER | BID/OFFER SPRD | DIF IN $ | | SIZE | BID | ASK | Px DIF | $AMNT |
| 11 5/8 N04 | 119.115 | 119.14 | 2.5000 | $78 | | 100 | 119.1 | | 1.5000 | $47 |
| 7 7/8 N04 | 111.2838 | 111.2888 | 0.5000 | $16 | | 100 | 111.28 | | 0.3750 | $12 |
| 5 7/8 N04 | 107.2974 | 107.2988 | 0.1350 | $4 | | 100 | 107.297 | | 0.0000 | $0 |
| 7 1/2 205 | 112.0875 | 112.0925 | 0.5000 | $16 | | 100 | 112.0875 | | 0.0000 | $0 |
| 12 505 | 124.1338 | 124.1475 | 1.3750 | $43 | | | | 124.13 | -1.7500 | -$55 |
| 6 1/2 505 | 110.2663 | 110.2688 | 0.2500 | $8 | | 100 | | 110.29 | 2.1250 | $66 |
| 6 3/4 505 | 111.1225 | 111.1225 | 0.000 | $0 | | 100 | | 111.13 | 0.7500 | $23 |
| 3 1/2 N06 | 102.2713 | 102.2425 | 2.8750 | $90 | | 100 | 102.27 | | 0.1250 | $4 |
| 6 1/4 207 | 113.2688 | 113.27 | 0.1250 | $4 | | 100 | 113.26 | | 0.8750 | $27 |
| 6 5/8 507 | 115.2525 | 115.2525 | 0.0000 | $0 | | 100 | 115.26 | | -0.7500 | -$23 |
| 4 3/8 507 | 106.055 | 106.06 | 0.5000 | $16 | | 100 | 106.07 | | -1.5000 | -$47 |
| 6 1/8 807 | 113.2725 | 113.2725 | 0.0000 | $0 | | 100 | 113.28 | | -0.7500 | -$23 |

FIG. 6

TRADING APPLICATION PROGRAM INTERFACE

CROSS REFERENCE TO RELATED APPLICATIONS

This application is a continuation of U.S. patent application Ser. No. 10/938,143 filed Sep. 10, 2004 which is a continuation-in-part of U.S. patent application Ser. No. 10/890,602, filed Jul. 13, 2004 which claims priority from U.S. Provisional Patent Applications No. 60/502,051, filed Sep. 10, 2003, 60/512,879, filed Oct. 20, 2003, and 60/513,664, filed Oct. 22, 2003.

BACKGROUND OF THE INVENTION

This invention relates to trading application program interfaces. More particularly, this invention relates to a trading application program interface suitable for use with quantitative analysis trading.

Quantitative analysis trading (colloquially known as "program trading" or "quant trading") refers to a trading strategy that makes use of information technology to substantially remove the human element from the decision-making process involved in trading. Such techniques typically depend on highly sophisticated computer models that often draw elements from a broad range of scientific and mathematical disciplines. Quantitative implementations may make use of both fundamental and technical data, and at their most complex, may balance multiple portfolios over a broad range of markets, communicating electronically with market makers, in real time, with substantially no human intervention.

Because quantitative analysis involves electronic communication and computer trading, it is critical that a trading application program interface being used for quantitative trading provides information regarding options available for immediate trading.

It would therefore be desirable to provide a trading application program interface suitable for quantitative analysis trading.

It would also be desirable to provide a trading application program interface that conforms to a set of preferably real-time trading rules and is suitable for quantitative analysis trading.

It would also be desirable to provide users with a trading application program having an application program interface (API) that is suitable for quantitative analysis trading and adapted to take advantage of first buyer/first seller privileges afforded by the trading application's interactive trading rules.

It would also be desirable to allow such users to identify and trade prices outside the boundaries of a current trading application's interactive trading rules and according to their particular requirements and where suitable logic allows.

SUMMARY OF THE INVENTION

It is an object of this invention to provide a trading application program interface suitable for quantitative analysis trading.

It is another object of this invention to provide a trading application program interface that conforms to a set of preferably real-time trading rules and is suitable for quantitative analysis trading.

It is yet another object of this invention to provide users with a trading application program having an application program interface (API) that is suitable for quantitative analysis trading and adapted to take advantage of first buyer/first seller privileges afforded by the trading application's interactive trading rules.

It is still another object of this invention to allow such users to identify and trade prices outside the boundaries of a current trading application's interactive trading rules and according to their particular requirements and where suitable logic allows.

One embodiment of the invention preferably includes a system for trading an item between an aggressor participant and one or more passive participants. The system includes a first workstation that receives bids or offers from the passive participants for the item at select prices and volumes, a second workstation that receives a trade command from the aggressor participant to hit or lift one or more of the bids or offers in order to sell or buy a desired volume of the item at a desired price and a programmed computer.

The programmed computer is preferably coupled to the workstations. The computer provides two different states. The first state is a system bid/offer state enabling the passive participants to participate by entering bids or offers with respect to the item and that, in response to a hit or lift of one or more of the entered bids or offers. The second state is a system trading state. In the system trading state, a trade transaction is executed in accordance with the hit or lift at a defined price set by the hit or lift, a period of exclusivity is provided enabling the aggressor participant and a designated passive participant to control subsequent trading by executing transactions between the aggressor and designated passive participant of additional volume of the item at the defined price to the exclusion of other participants desiring to participate in the trading, and, finally, during the period of exclusivity, the other participants are allowed to hit or lift a bid or offer at a price other than the defined price.

In other aspects of the invention, an exclusive priority that may previously have been associated with the aggressor, the designated passive participant or other suitable participant, may be transferred by the aggressor, the designated passive participant or other suitable participant to another price behind the touch price of the original trade. Once transferred, the original exclusive priority at the touch price may then be assumed by another party, thereby truncating the priority of the aggressor, the designated passive participant or other suitable participant at the designated price.

In yet another aspect of the invention, a system delta may be implemented whereby hits or lifts that are a predetermined number of price levels away from the touch price are rejected.

In still another aspect of the invention, certain prices are guaranteed by the system following certain sequences of events which will be described in more detail below.

BRIEF DESCRIPTION OF THE INVENTION

Further features of the invention, its nature and various advantages will be apparent from the following detailed description of the preferred embodiments, taken in conjunction with the accompanying drawings, in which like reference characters refer to like parts throughout, and in which:

FIG. 3 is an illustration of an electronic trading interface in accordance with some embodiments of the present invention;

FIG. 4 is an illustration of another electronic trading interface in accordance with some embodiments of the present invention;

FIG. 6 is an illustration of an electronic user interface in accordance with some embodiments of the present invention;

DETAILED DESCRIPTION OF THE INVENTION

Figure 1:
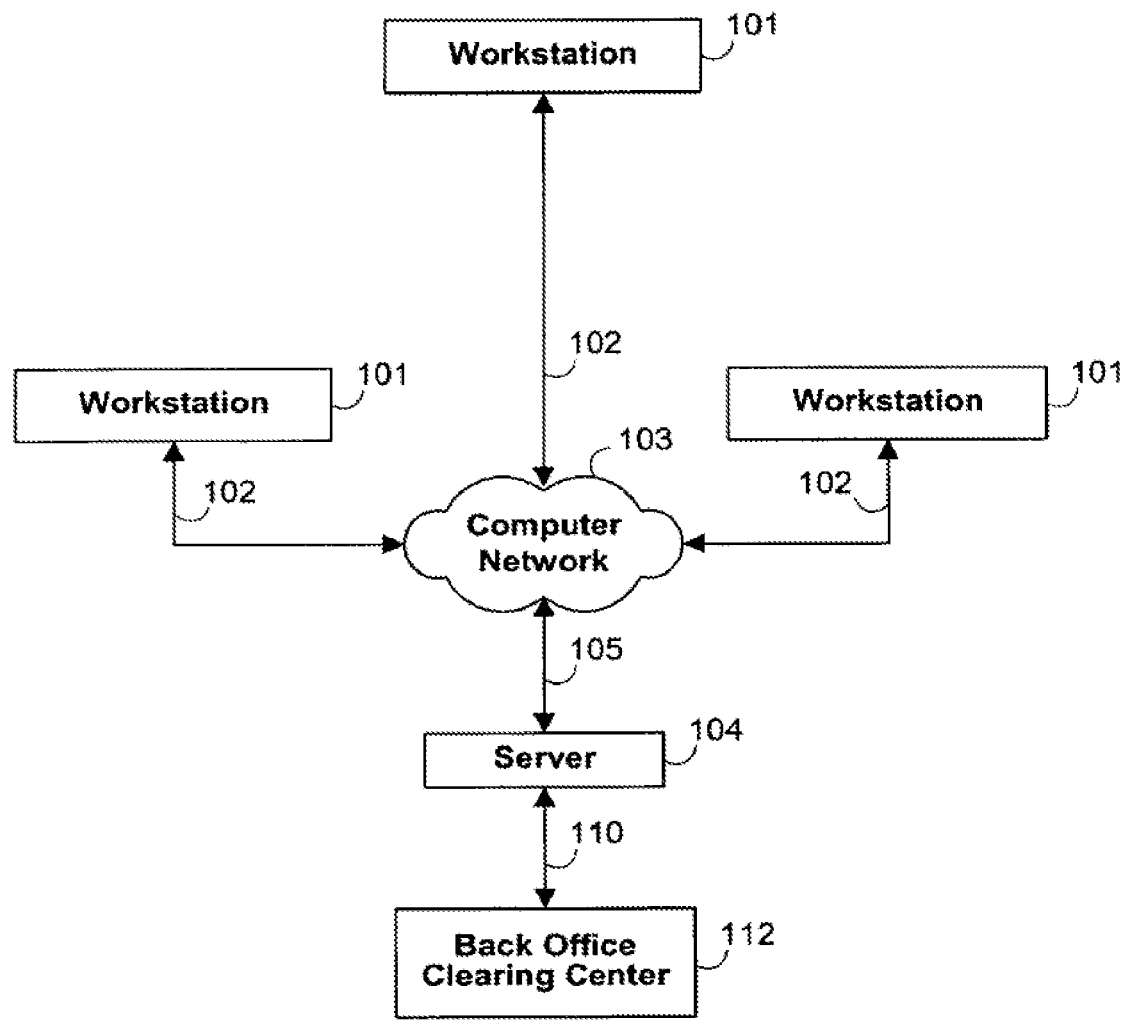
FIG. 1 is an illustration of an electronic implementation of a system in accordance with some embodiments of the present invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the electronic trading system. Furthermore, server 104 may also contain an electronic trading system and application programming interface and merely transmit a Graphical User Interface or other display screens to the user at the user workstation.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 102 may be used to implement the electronic trading system application and application programming interface according to the invention.

Back office clearing center 112 may be any suitable equipment, such as a computer, a laptop computer, a mainframe computer, etc., or any combination of the same, for causing transactions to be cleared and/or verifying that transactions are cleared. Communications link 110 may be any communications links suitable for communicating data between server 104 and back office clearing center 112, such as network links, dial-up links, wireless links, hard-wired links, etc.

Figure 2:
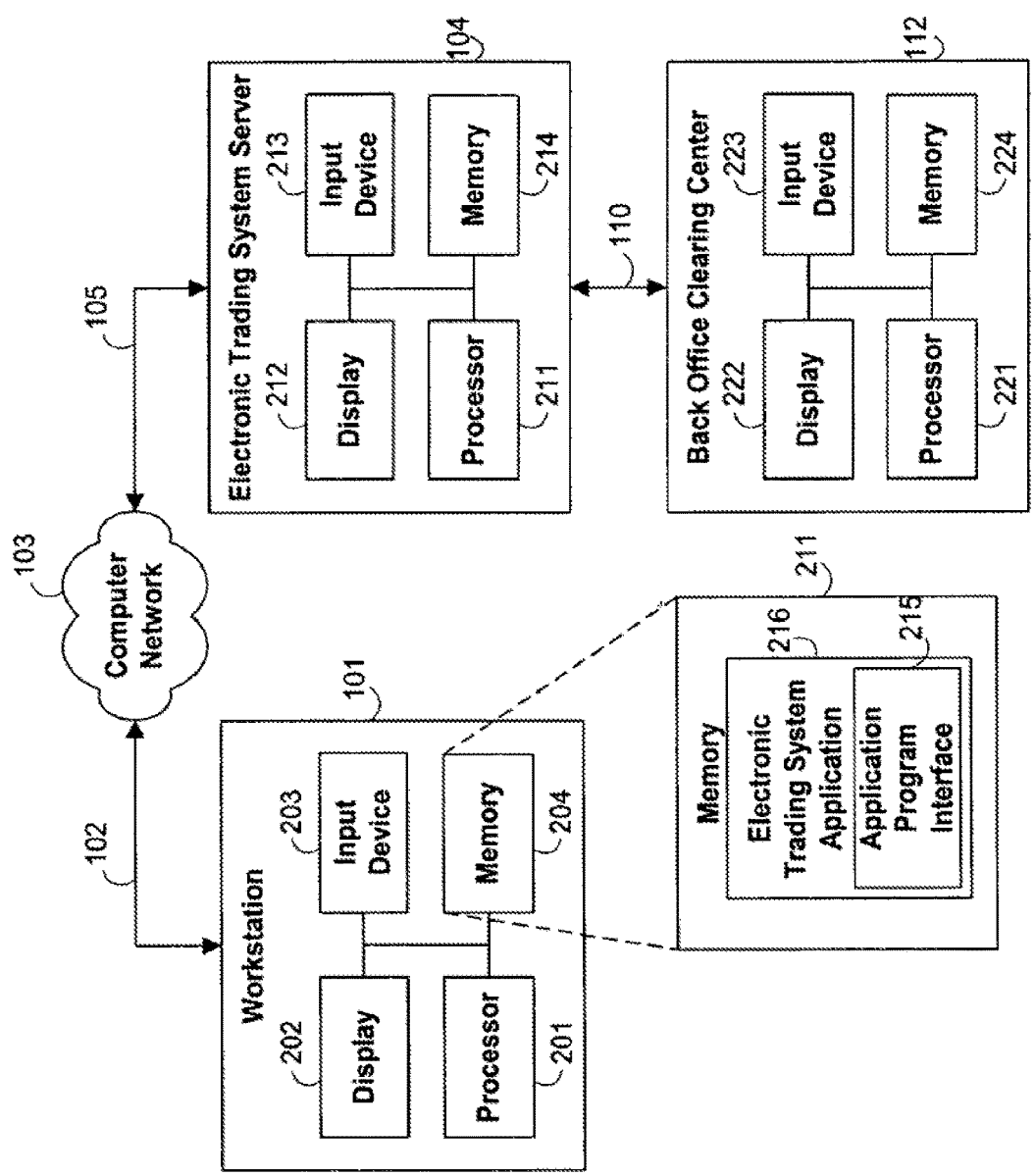
FIG. 2 is an illustration, in greater detail, of an electronic implementation of a system in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Memory 204 also preferably contains an electronic trading system application 216 according to the invention.

Electronic trading system application 216 may preferably include application program interface 215, or alternatively, as described above, electronic trading system application 216 may be resident in the memory of server 104. In this embodiment, the electronic trading system may contain application program interface 215 as a discrete application from the electronic trading system application which also may be included therein. The only distribution to the user may then be a Graphical User Interface which allows the user to interact with electronic trading system application 216 resident at server 104.

Processor 201 uses the workstation program to present on display 202 electronic trading system application information relating to market conditions received through communication link 102 and trading commands and values transmitted by a user of workstation 101. Furthermore, input device 203 may be used to manually enter commands and values in order for these commands and values to be communicated to the electronic trading system.

In one embodiment of this invention, Trade-Through-the-Stack trading rules (TTS) preferably allow the user to identify and trade prices outside the boundaries of the best prices shown by the trading system. Such a trade may not invoke the trading system (or alternatively, the trading application's) interactive trading rules as will be described in more detail below. Preferably, price improvement (PI) benefits, which are described in U.S. patent application Ser. No. 10/171,009, filed on Jun. 11, 2002, which is hereby incorporated by reference herein in its entirety, may also be applicable in some form in TTS trading.

Figure 7:
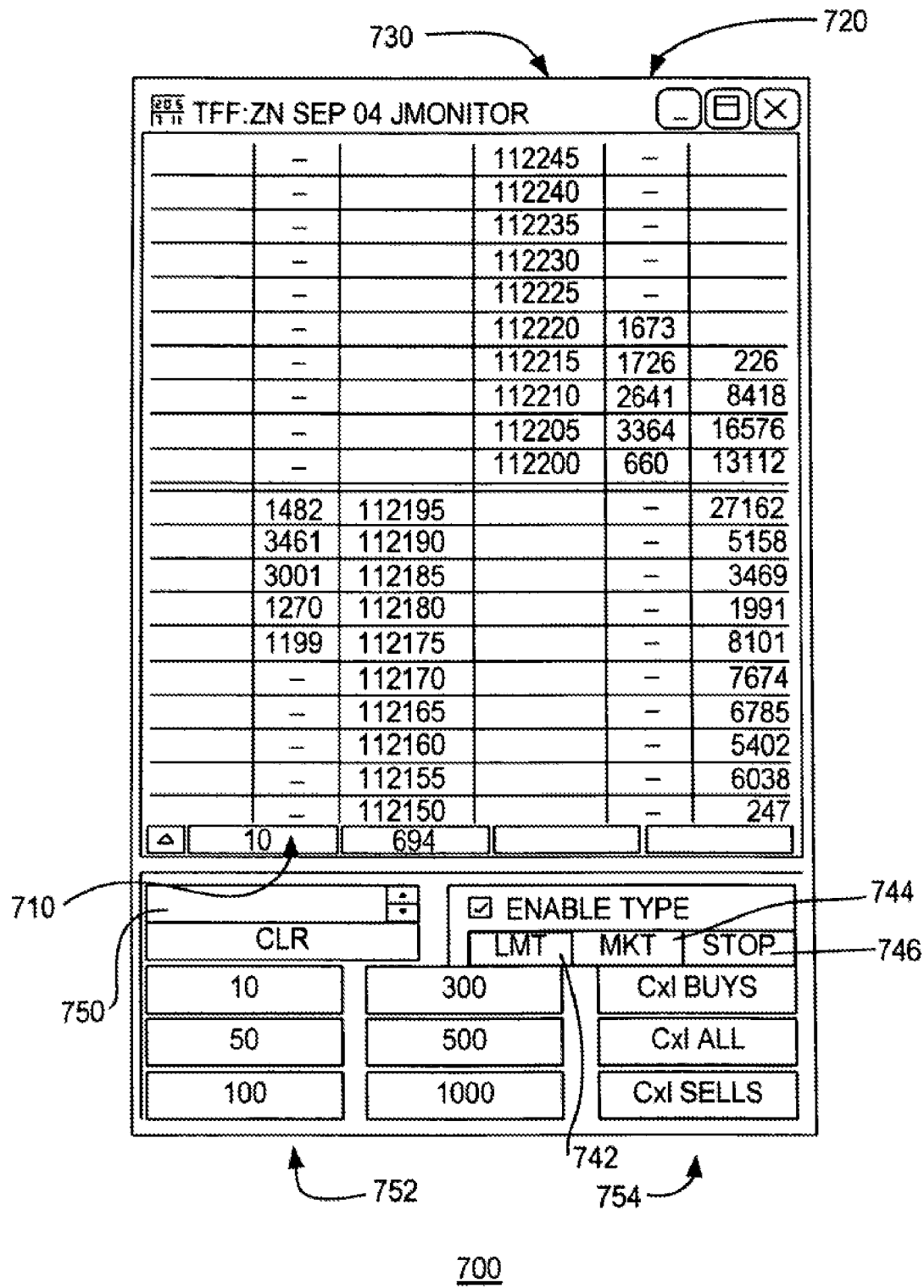
FIG. 7 is an illustration of an electronic trading interface in accordance with some embodiments of the present invention.
Figure 8:
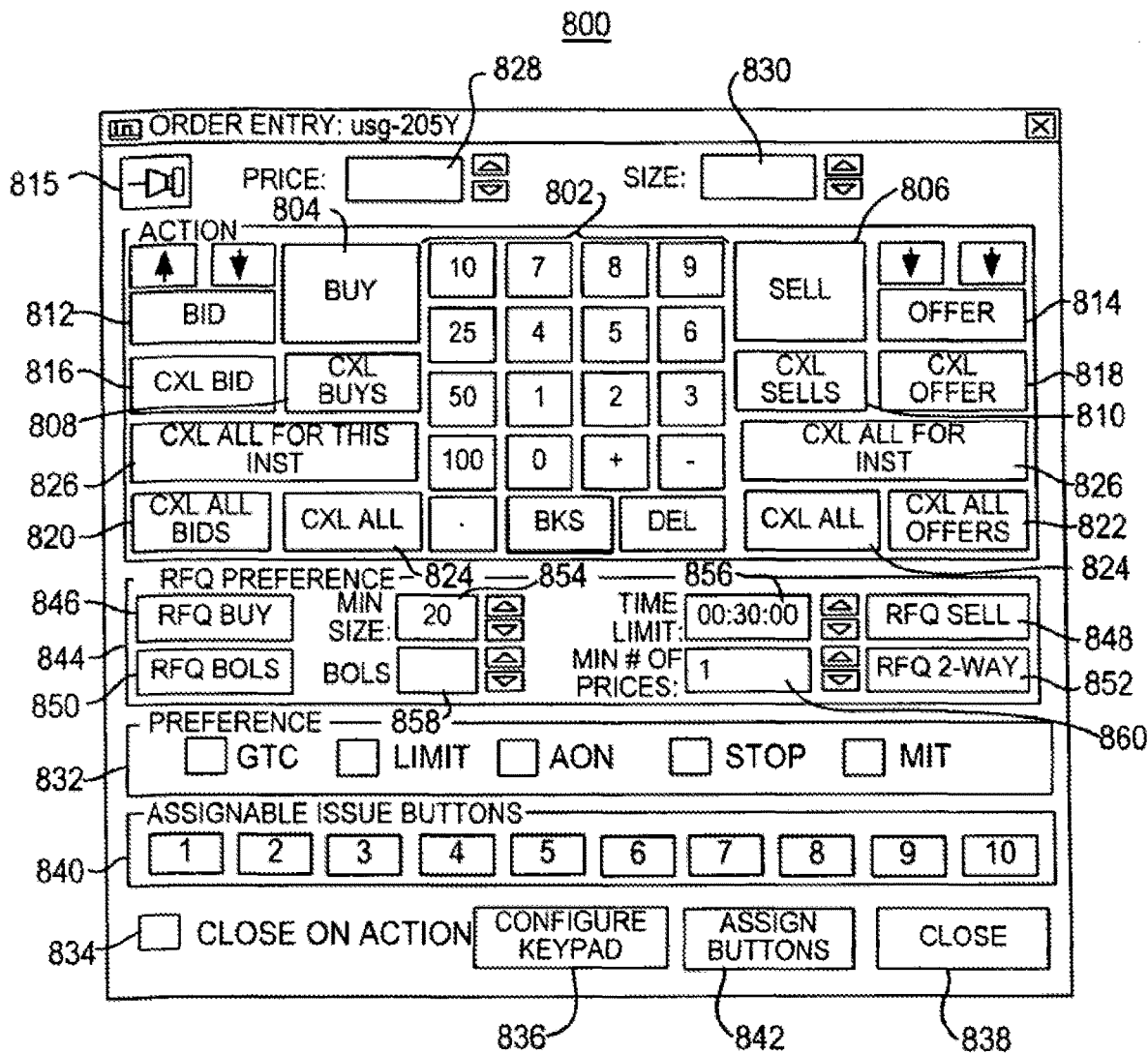
FIG. 8 is an illustrative order entry dialog box in accordance with certain embodiments of the present invention.

To fully understand the TTS system and method according to the invention, it is important to understand a trading system according to the invention upon which the TTS rules are implemented. One embodiment of an interactive trading system is described in U.S. Pat. No. 6,560,580, which is hereby incorporated by reference herein in its entirety. Other embodiments of trading systems such as a FIFO (First in, first out) system and a RFQ (Request for Quote) are shown in FIG. 7 and FIG. 8, respectively, and described in more detail below in the portion of the specification corresponding to FIG. 7 and FIG. 8.

Interactive trading may use a number of trading states to define the ability of users to negotiate and trade with one another. Each of the various states may be associated with a user interface display screen. Alternatively, all of the various states may be associated with a single display screen that includes various indicators to denote the current system state. The user interface may appear as follows:

FIG. 3 shows an illustrative trading interface 300 for interactive trading that is adapted for implementing systems and methods according to the present invention. The interface includes a top line 301 (alternatively referred to herein as the touch line, or the headline.) Top line 301 may preferably be adapted to include the price that should be initially aggressed to start a trade or, alternatively, top line 301 may show the status of the actual aggressed trade (as shown below in FIG. 4). In either case, top line 301 is typically located at the top of the quad (quad being defined as the display area related to trading of a particular instrument.) Top line 301 may include item 302, price 304 which may show bids 303 and offers 305, size 306 and last price 308. Interface 300 also includes market depth information 310, which shows price and size for items that have not yet been traded (commonly known as the book). Also shown in interface 300 are bid and offer stacks 312 and 314, respectively. Bid and offer stacks 312 and 314 may indicate the size that one or many market participants are bidding or respectively offering at the current bid and offer prices 303, 305. Note that price 304 (shown as 100.00+-100.012) in this exemplary example is shown in a traditional United States Government Bond pricing format. In some embodiments the server 104 may store data for pending bids and offers in one or more databases, and may further store information enabling those databases to hold logical representations of the bid and offer stacks 312, 314. The server may update any such databases when new bids and/or offers are made. Such embodiments may then access the or each database so as to provide portions of the display for interfaces such as shown in FIG. 3. The or each database may store not only the size data shown in the interfaces but also may store identity data of the participants making the bids and offers.

In FIG. 3, interface 300 shows a bid/offer state. This state enables participants to enter into the system bids and offers at select prices and volumes for the item being traded.

A system trading state typically referred to as the workup state is shown in FIG. 4. This shows interface 300 after receiving a first hit—i.e., an acceptance of a pending bid— (or take—i.e., an acceptance of a pending offer—) trade command from an aggressor participant—i.e., a participant who initiates a trade—responding to presented bids and offers. The hit (or take) is for transacting a trade of a desired volume of the item at a desired price. In response to the hit (or take), the trading system preferably transitions from the bid/offer system state to the workup state in order to transact a trade of the item at a desired price. In alternative embodiments of the invention, any suitable command—e.g., a bid or offer—may cause a trade to be executed. Alternative electronic trading systems, such as the systems described below with respect to FIGS. 7 and 8, which may or may not be state based systems, are also suitable for implementing systems and methods according to the invention.

It should be noted that once trading has commenced, the participant that posted the bid or offer and the participant that responded with the hit or lift of the bid or offer are generally awarded, under certain conditions, exclusive trading privileges for some pre-determined period. Systems and methods according to the invention, based on the TTS rules, preferably allow others—i.e., that do not enjoy exclusive trading privileges—to participate in trading the traded item during the pre-determined period, as will be explained in more detail below.

In one embodiment of the invention, the exclusivity of the two priority participants is limited to trading at the price at which the first hit or lift was transacted—i.e., the touch price. Thus, the two priority participants, and other participants who may join the trade following the termination of exclusive rights of one (or both) of the first two participants, retain exclusivity only at the touch price. The period of exclusivity may end either as a result of the timing out of either of the participants or the election by either or both of the participants to terminate their exclusive trading session. Following the exclusive period, no one can control the trade to the exclusion of others. The system then tests for and executes any new transactions entered by new Participants preferably at the touch price.

In one embodiment of interactive trading, any new bid or offer is shown as clear—i.e., available to be traded immediately—to trade only to the highest price/time priority existing contra order in the system for a predetermined, preferably exclusive time period in bid/offer state. Another trading state, referred to herein as a when state, is triggered by a trading command in the workup state against an uncleared bid/offer—i.e., not available to be traded—by an aggressor who is not one of the original participants on the contra-side of the uncleared bid/offer. Again, the methods and systems according to the invention may be implemented in any suitable state-based or non-state based trading systems.

As stated above in brief, system controls preferably do not allow this trading command by the new aggressor to be instantaneously executed. In accordance with system logic, the trading processor creates a time interval or delay, and thereby provides the original participants time to assess the new situation and to respond to the uncleared entry on the passive side. In one embodiment of the invention, the non-priority contraparties to the aggressor's order—i.e., the contraparties that are listed in the book at worse prices (or later times, or both worse prices and later times) than the touch price may be prevented from canceling their respective orders until either (a) the orders are executed or (b) the aggressor's order is filled or canceled. In embodiments this may be achieved by a state in which the server does not enable cancellation by those contraparties of bid/offer information in the or each database which stores bid/offer information. The state in which the non-priority contraparties are prevented from canceling their respective orders is known as the guarantee state (which may alternatively referred to herein as the hold state).

The guarantee state is described in detail as follows. If the same or another participant elects to execute a trade and enters an order for a price that is worse than an available touch price, then the contraparties to this order are prevented from canceling their respective orders until either (a) those orders of the contraparties are executed (b) the order for the price that is worse than the available touch price is filled (for example by other contraparty orders at equal or better prices than the original contraparties' orders) or canceled, or (c) new orders enter the system that can then take the place of those originally prevented from canceling. The order from the aggressing contraparty, who effectively created the guarantee state in which his order is held until the conclusion of the present trading state, may also be prevented from canceling until the conclusion, and immediately thereafter, of the guarantee state as the system transitions into the next state in the circumstance that the original aggressors decline to trade with the new participant.

In some embodiments, the server 104 may store in a database an entry including the volume and other trade data of a trade order of a participant having a price that is worse than an available touch price where the currently available touch price is not available to the participant. The server may access a database of contraparty bids or respectively offers, and may cause those orders of the contraparties to be executed or may automatically fill the order for the price that is worse than the available touch price. If the order for the price that is worse than the available touch price is canceled, the guarantee state may be exited and the server may enable cancellation of the contraparty bids or respectively offers.

It should be noted that the participant that entered the order for the price that is worse than the touch price may be informed by the system at the time of order entry that he is confirmed to trade at no worse than the price of the orders of the contraparties. The system may then inform him following the execution of the trade whether, in fact, he received a better price than the price at which he originally was confirmed to trade.

Not only does such a system obtain advantages for a participant by guaranteeing him some execution price and then searching for a better price, but such a trading system obtains distinct advantages over conventional systems with respect to the implementation of the system itself. One such advantage is that the number of messages sent to participants by the system is reduced, thereby reducing the system overhead, because the system has already confirmed a "no-worse than" trade at a particular price. Then, the system can search for a better price for the participant, without having to constantly update the participant or to confirm that the participant still desires to trade (in the embodiment where the participant is held such that he may not cancel his order). The system could then only send out one message after the trade has been executed that updates the participant with respect to the actual price at which the trade was executed (or an average price from different price levels traded). Furthermore, this system (and method) is in stark contrast to the conventional open outcry method of trading wherein if a trade was not yet executed, then the participants could not be locked into a position.

In systems and method based on the TTS rules of the invention, participants other than the priority participants are permitted to trade with other non-priority participants during the exclusive period, with certain restrictions. Preferably, each of these other, non-priority participants are restricted to trade at prices other than the touch price in order to maintain exclusivity for the priority participants at the touch price. To reiterate, this type of trading by non-priority participants is referred to herein as TTS (Trade-Through-the-Stack) trading.

The following principles may preferably guide TTS trading rules according to the invention.

A first rule according to one embodiment of the claimed invention is as follows: the priority participants or workers in the workup state control priority at the touch price of the trade, but desperate traders can "trade and run"—i.e., trade in a one-time fashion, with preferably no ability to continue the trade after that trade—at limit order prices behind them in the book—i.e., at levels worse than the touch price. (A limit order is an order to buy or sell a predetermined amount of an instrument at a specified price or better than the specified price. Limit orders also may allow an investor to set the length of time an order can be outstanding before cancelled.)

Based in part on this understanding, the second rule, according to the invention may be described. The second rule may include implementing trading at finer pricing granularity—e.g., the granularity may be ½ the normal listed minimum increment (increment being defined as the value at which the price is displayed) for the traded security. For example, the normal granularity for a five year note is ¼ of one thirty-second of a point (one one-hundredth of a percent of the total value of the instrument). In one embodiment of a system according to the invention, ⅛ths of one thirty-second of a point may be available in the 5 year note on a restricted view basis. For example, these finer granularity prices may only be available, to participants that participate in a trade. Alternatively, these finer granularity prices may be available to all viewers of the screen. Thus, instead of limiting pricing granularity to 100.002, 100.00+, 100.006, other additional prices such as 100.001, 100.003, 100.005, and 100.007 may also be available to participants in TTS or other suitable trading. These prices may also be available to viewers of the screen, preferably only subject to the conditions enumerated above.

In yet another group of alternative embodiments, the finer granularity prices may be available to all viewers, yet the size associated with the finer granularity prices may only be available to the participants in the trade, or the size associated with the finer granularity prices may not be available to anyone (excluding the party who provided the finer granularity price). Alternatively, a non-standard bid or offer may be displayed only when the bid or offer is between the best bid and the best offer. In yet another alternative embodiment, the trading system may guarantee the completion at a price between the price of the queued hit or lift and the trading price.

In still another alternative embodiment, a hit or lift at a defined price may be guaranteed to be traded without identifying, or, alternatively, without confirming a passive participant. Such a hit or lift at a defined price may be guaranteed to be traded without identifying or, alternatively, confirming the price at which the hit or lift will, in fact, be traded.

One particular state-based example of a trade which implements the second rule of TTS trading is one that in bid/offer state is at 100.00+/100.006 which then goes, in the workup state, to TAKE 100.006. The second rule states that, in such a trade, the displayed 100.00+ bid may originally have been a 100.005 bid in the book (more finely granular than the standard ¼ increment, the standard increment being defined as the smallest allowable price difference (which may be a system set or exchange set value) between the best bid and the best offer when the best bid and the best offer are not the same) but is only shown in the touch line at a standard increment. While it can be acted upon in the trade as 100.005, nevertheless, it was only displayed in bid/offer state (or, alternatively, in the book at any time) as a 100.00+ bid in order to maintain the displayed spread of ¼ of a thirty-second a point. Additionally, the more granular 100.005 may become part of the book in the workup state. This price may be available either to the priority participants or, alternatively, may be available in a when state or trade (alternatively referred to herein as a "hit-and-run")- and run-trade to non-priority participants during workup state. Alternatively, the methods and systems according to the invention may be implemented in any suitable trading system (e.g., the trading systems illustrated in FIGS. 7 and 8).

Such a trade carries on from the above-described trade as follows: after the TAKE at 100.006 created a workup state at 100.006, a third, non-priority, participant may enter, for example, a bid for 100.005 (or alternatively, the original touch line bid may be now revealed to show that it was not a 100.00+ bid but rather a 100.005 bid). Then, the priority participant who is contra to the 100.005 bid may elect to hit the 100.005 bid if the seller at 100.006 has terminated. When the priority participant elects to sell at 100.005 to the new bidder, the workup state would effectively go from 100.006 immediately to a workup state at 100.005. Or, alternatively, a non-priority participant may elect to hit the 100.005 bid, and wait until the priority contra participant either hits the bid, terminates or times out. This would also effectively change the trade from 100.006 immediately to a workup state at 100.005.

In yet another rule relating to pricing at finer granularity, the following sequences may be implemented. While a more granular price—i.e., the 100.005 price described above—may be listed in the book and may be available in a hit and run or other TTS trade, nevertheless, this price may never show (or in an alternative embodiment, be available to trade) at the touch line. Rather, whenever the price reaches the touch line, either because it became the best bid or offer in the system or because it was acted upon, it automatically shows at the nearest conventional granularity—i.e., a bid of 100.005 shows as a bid of 100.004 in the touch line and an offer of 100.005 shows as an offer of 100.006 in the touch line.

A third rule may be that the first/priority worker retains priority rights—i.e., the exclusive ability to trade the particular instrument on the side (buy/sell) for which the worker entered—at the initial traded price, and may be able to re-bid/offer at a slightly worse price during (or immediately following) the workup state. If a better price comes in after the priority worker has changed his price to a slightly worse price, the better price does not assume priority, but may truncate the exclusive first buyer/seller priority at the touch price. Alternatively, in this particular scenario, the priority worker's priority may preferably be truncated, while any new participant may assume priority at the original touch price, if the new participant entered his price after the priority worker changed his trading price.

Price improvement may preferably be available on all finer granularity price levels that may be available in the bid/offer state. Thus, price improvement may be implemented on such 1/8th prices as may be used for TTS trading. In one embodiment, price improvement in general, and different levels of price improvement in particular—e.g., where relatively more and less aggressive levels of price improvement are permitted, may be (a) revealed to—viewable by—participants in the trade, (b) revealed to select participants in the trade (e.g., market makers, the status of whom may be determined by a pre-selected criteria (one such criteria may define market makers as being participants whose bids or offers were displayed during bid/offer state, (or, alternatively, market makers may be defined as the participants whose bids or offers were displayed during bid/offer state within a predetermined time before the transition to trade state) or other suitable method), (c) revealed to viewers of the trade (d) or revealed to any combination of (a), (b) and (c). (It should be noted that participants may enter bids below the headline trading price or at any other suitable price and offers above the headline trading price or at any other suitable price into the book during trade state. These bids and offers may or may not qualify the associated participants as market makers.) Alternatively, the finer granularity price levels themselves may be restricted in their viewability in the same way that the price improvement restrictions are defined above.

It should be noted that, with respect to price improvement and interactive trading, the term aggressive characterizes a willingness to trade at a price level beyond—i.e., worse than—the touch price. Thus, when the more aggressive trader is a buyer, he is willing to buy at price that is higher than the price offered in the touch line. When the more aggressive trader is a seller, he is willing to sell at a price that is lower than the price bid in the touch line.

The following is a description of TTS trading in the workup state. Limit orders from the book are accessible from the workup state. The information on the status of each order for a user is preferably shown to the user. It is also shown to the user when that status is changed and when the limit order is promoted from the book to the "touch price" position (and any corresponding change in availability). This allows users to know not only when a price is accessible to them, but also when a price is accessible to only them.

TTS allows for users to trade through a price from bid/ask state, to a limit price worse than the touch price, if the users show enough size and aggression on the price (preferably, the aggression is restricted to a pre-determined system delta from the touch price. The delta may be a price difference, a size difference or a price and size difference between the user-entered price and the head line price. Alternatively, the delta may be a predetermined number of book entries—e.g., three—away from the head line. One advantage of this pre-determined system delta is that it preferably protects against user error by preventing orders that are too distant from the touch price from being executed). This may encourage users to add prices to the order book, thereby increasing liquidity and transparency, in the hope of having the users' respective orders filled.

When a TTS in the workup state happens, all trades behind the touch price at non-touch limit prices (preferably executed without continuing priority) are treated as a substantially simultaneous execution (or, alternatively, the TTS trades occur at the end of the priority period or at any other suitable time) of a trade together with the original trade rather than an individual workup at a new trade price. Thus, an 1/8th incremental price is preferably barred from becoming the touch trading price, but rather the system carries on showing the headline price trading, with 1/8th limit orders in the book flashing HIT or TAKE underneath the headline price. This trade is shown in FIG. 5.

Figure 5:
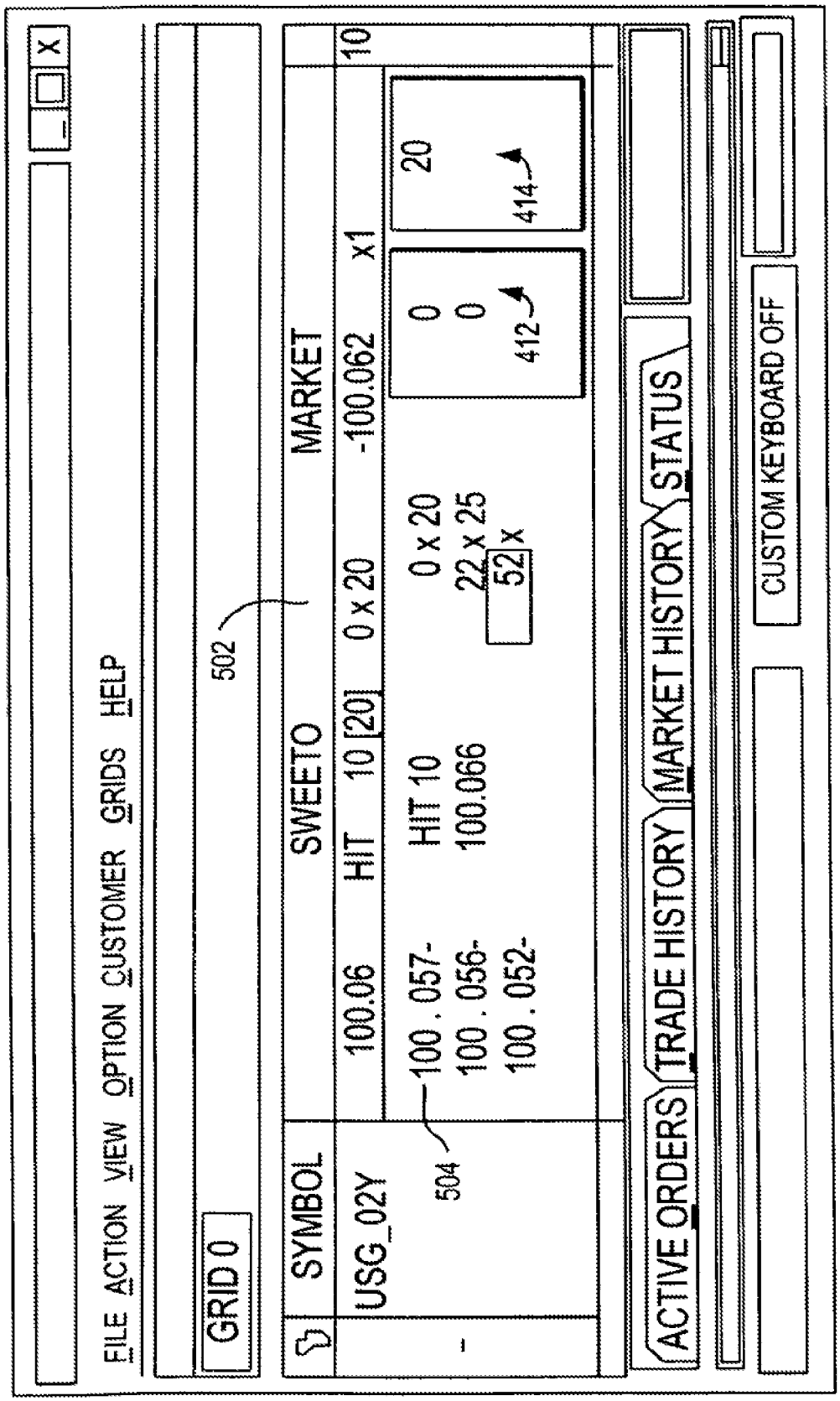
FIG. 5 is an illustration of yet another electronic trading interface in accordance with some embodiments of the present invention.

FIG. 5 includes a TTS trade that occurs during a workup state. Display 500 shows a display in which a TTS trade occurs during a workup state. In this trade, a trade at 100.06 is occurring in the touchline 502. Typically, the current participants in the trade enjoy a priority. Line 504 shows an additional trade (for a volume of ten of the item that shows that the bid price has been hit) is occurring at a price—i.e., 100.05—that is worse than the touch price.

The following is one set of possible rules for Trade-Through-the-Stack trading. It should be noted that one or all of the following rules may be used according to the invention. It becomes important for users to also view the order book of prices behind the touch price (even when the touch price is unclear—i.e., not available—to those users). Users can attempt to trade with the prices in the limit book preferably according to one or more of the following rules:

1) If a TTS order exceeds the allowable system delta (from the headline trading price), the order is preferably rejected before any size is traded. The trade is likely to be an error even if the size being hit or lifted is available in the book of orders.

2) Preferably, only one priority worker is allowed per side on the touch line during a workup state. A priority worker can carry on the priority strikes in the current manner. For example, during the workup state when 100.00+ is trading, and first seller can type <10 SELL> in order to trade more at 100.00+ or he can carry on his priority at a different level. He can do this by typing <100.005 10 SELL> to "back himself up" to 100.005 and have priority at that level. Nevertheless, if he backs up beyond the next limit order available, then he may be forced to lose priority immediately because he has essentially made his price worse than the existing market price.

Once the priority participant has backed up—made his price worse by moving a bid/buy down, or an offer/sell up a small increment to try to "do better" for himself at the expense of his future contraparty—his price to 100.005, then, if someone else types <100.00+ SELL>, the priority participant loses priority at the original touch price. Nevertheless, priority preferably can only be removed in this way when a priority worker has changed his bid/offer to a level less competitive—i.e., puts in a bid lower than the bid the priority worker put in originally, or puts in an offer higher than the offer he put in originally—than the touch line trading price. This preferably prevents gaming for advantage by other users trading just a small volume of the item at an ⅛th of a thirty second more aggressive than the priority user at the touch line trading price, to truncate the priority of that first user.

To reiterate, where a seller has backed up to a worse price, he remains priority seller in the trade unless bettered. After the trade is concluded, as a result of an expiration of a pre-determined period of time, or some other suitable impetus, the remaining priority participant should retain first priority "on the follow"—i.e., in the bid/ask stack of the next trade at the same price level according to existing last trader/last priority rules.

3) All sizes shown in the Buy and Sell "breakout stack" (such as 312 and 314 in FIGS. 3, 412 and 414 in FIGS. 4 and 512 and 514 in FIG. 5) are for the touch trading price only. Sizes available outside the touch price (the limit book) may preferably be shown aggregated next to their respective price levels.

4) If priority is lost on both sides of a deal, and a trader uses TTS while the trade is still working—i.e., during the period of time wherein the system tests for and executes any new transactions and no party can control the trade to the exclusion of others—then all TTS trades are tested for and, if possible executed at the touch price as well. Then all sizes are traded at the touch price, and then, if necessary, trades are executed to the limit price requested to fill the order (flashing the HIT or TAKE accordingly at that limit price level).

5) If priority is lost on the same side as the TTS attempt but is still current on the contra side (e.g. a TTS HIT when the first seller in the deal is done, but first buyer still has exclusive priority), then the system preferably trades all contra size at the touch price and then queues—i.e., holds, preferably for a predetermined period of time—the remainder of the TTS order, while disallowing further cancellation of the remainder of the TTS order. The necessary limit amounts behind the first buyer will be held from canceling the amounts that match the remainder of the TTS order. These matching amounts will be held until the first buyer has either bought the remainder of the TTS sell, elected to end his order, or has timed out.

In one example of this rule, the touch line may show "100.00+ HIT 10 10×zero"

There may be a further indication in the touch line that shows that the seller is done[1].

[1] At this point of the trade, a termination of the seller's priority may occur either as a result of the seller's election or because the seller times out.

The buyer, on the other hand, retains priority. Then, there may be a bid behind the priority buyer for 90 m (million) at 100.002 (a price which is, in fact lower than the outstanding bid and, therefore, which is a price "behind" or "beyond" the priority buyer (or bidder)). Thereafter, a new seller sends a TTS "100.002 sell 50 m"—i.e., a sell order that is below the touch price. Immediately, the TTS hits the bid for the remaining 10 m of the priority buyer's order. This leaves the remainder of the TTS sell order to match with 40 m bid at 100.002. Nevertheless, this trade for the remaining 40 m is not yet executed because the priority buyer still retains the right to buy at 100.00+.

Thereafter, a new seller sends "100.002 sell 50 m"—i.e., a sell order that is below the touch price. Immediately, the TTS hits the bid for the remaining 10 m of the priority buyer's order. This leaves the remainder of the TTS sell order to match with the 40 m bid at 100.002. Nevertheless, this trade for the remaining 40 m is not yet executed because the priority buyer still retains the right to buy at 100.00+.

In this particular example, the 100.002 bidder then cannot cancel 40 m of his original order—i.e., 40 m of his bid is held until the resolution of the priority buyer. At this point, the TTS order (characterized as the 100.002 seller) is there to sell 40 m more at 100.00+ if the priority buyer (or subsequently anyone else) wants to buy them at 100.00+. The TTS seller also cannot cancel the 40 m remaining of his sell order because it will be matched at the first opportunity (either at 100.00+ or later, by the next buyer below in the stack, at 100.002). It is significant here that the untraded, yet about-to-be matched orders cannot cancel. It should be noted that in one embodiment of the invention, the guarantee state may preferably only occur in workup state. Alternatively, the guarantee state may be implemented in bid/offer state as well, as will be explained in more detail below, or in any other suitable electronic trading system or method such as the trading systems illustrated in FIGS. 7 and 8.

When the trade continues, a trading system according to the invention preferably waits (up to 4 seconds in one embodiment for United States government securities) for the initial priority buyer to buy more out of the 40 m for sale at 100.00+ before the trading system allows the HIT to occur at the 100.002 bid in the size balance left over. Thereafter, the 100.002 limit bid is free to cancel any untraded size that may still remain.

6) If priority is current only on the same side as the TTS attempt, the following rule may apply. The system preferably allows the TTS order to trade immediately at the targeted limit price behind the touch price, as a "trade and run and cleared" part of the overall trade workup. Thus, the TTS order bypasses the size at the best price (which is temporarily reserved for the priority worker), and trades behind immediately. In this case, the TTS order may be considered to have circumnavigated the first buyer, first seller rules by trading at a more aggressive price.

For example, if the headline shows 100.00+ HIT 10 where the buyer has no priority, and there is a 100.002 bid for 90 m behind, and the first seller still has priority, then, if a new seller sends "100.002 sell 50 m," the 100.002 bid trades immediately in 50 m at 100.002 with the new seller.

7) In yet another rule, which may apply to action occurring during a workup state, if a TTS order has assumed the priority position and exhausted all possible contra size available to its price (within some range which may be predetermined by a system delta), it preferably becomes the touch line order in the buy/sell stack at the touch price (or alternatively, the TTS bid/offer becomes the headline price beyond the touch price—i.e., at one of the exhausted prices), albeit with no matching contra order. In one embodiment, this TTS order may be adapted to re-engage any new orders that are behind the touch price when they appear, to the extent that this TTS order's original price limit applies to match newly entered orders.

8) Another rule which applies to TTS trading relates to "hidden size." A hidden size functionality in a trading system according to the invention allows a user to show a predetermined portion of a larger order size. In one embodiment of the invention applicable to state-based trading, hidden size contra orders, that are engaged in workup state TTS according to the rules above, may be fully exposed up to the amount that can be traded, before the next contra order, or price level, is touched.

In another aspect of the invention, new approaches to providing system transparency are provided. In an interactive trading application interface according to the invention, users can visually determine whether they are priority participants during the trading system state by observing the screen colors in this state with respect to the other participants. If they see a zero (or other number) in a predetermined color at the top of the breakout stacks referred to above, users know they have the priority worker status. If users see a zero (or other number) in another predetermined color, they know someone else has priority. Participants can also see the limit bid and offer orders in the book below and above the trading price. Seeing the limit orders allows the participants to make a judgment with respect to what to do when the present trading system state terminates if participants do not trade at the touch price.

Two approaches according to the invention preferably adapt a trading system application trading interface (API) according to the invention to help users, and user APIs (notably, in an automated fashion), to see what the user eye and mind can deduce in interactive trading systems. This preferably promotes system transparency because it allows users, and user APIs, to access information relating to priority. Then other non-priority users may access the next price without waiting. This preferably increases trading efficiency.

The following includes approaches to providing system transparency according to the invention. When the trading system API carries a price to a user, or user API, the following attributes or flags may also be sent from the trading system to that user so the users are cognizant of the manner of bid/offer, workup state, or other suitable trading situation in which they presently are operating. In one alternative embodiment, these messages may be sent as audio files whereby the workstation associated with a participant may provide audio messages corresponding to the messages in the following table.

| Trade State Attributes | Associated Message |
|---|---|
| Price/Size Clear to You | A particular buy/sell/bid/offer is clear for a user to trade immediately - i.e., no order queuing delay would result from such a trade attempt |
| Price/Size Unclear to You | A particular buy/sell/bid/offer is not clear for a user to trade immediately - i.e., another user has priority over the this user and a subsequent trade attempt would result in a queued message from a trading system, and a delay for this user for inclusion into a workup state |
| Price/Size Clearing to You | A particular buy/sell/bid/offer is clearing only to the particular user. Included with this message may be an indication of how long the exclusive priority period may last |

It should be noted that the exclusive right to trade a particular buy/sell/bid/offer is an option provided to the priority user and may have considerable market use as well as substantial cumulative net value. Traders who have priority in a particular security or instrument can electronically trade related derivatives markets, such as futures markets for the security or instrument, with the knowledge that no other party can take over priority to trade the security or instrument at that time (in the particular trading system where the trader enjoys priority for the instrument.)

In the embodiment of the invention that relates to audio files being sent to the participant that correspond to the status of trading that the participant is engaged in, the following disclosure applies as well. Before electronic trading, voice brokers provided a service not just in terms of execution, but also in terms of confirmation in addition to providing other trade data. Voice brokerage was supplemented by the electronic broadcast of such information. However, to buy, sell or access market information, one needed to call the voice broker.

With the advent of electronic trading, confirmation and trading data are preferably all returned to the trader in text form. While a number of alert sounds could be set up, these notify the trader only that something has happened. Traders therefore use sight and sound to gauge market conditions with the help of voice brokering supplemented with electronic trade data.

The audio files described above form a part of systems and methods for traders to receive instantaneous confirmation of trade execution and post-trade execution data. Such information and other market information may be relayed via a data to voice service in an electronic trading system. Such a system may be implemented to alert active market participants of the status of a trade in real-time, and to provide instantaneous audio files relating to trade confirmation.

The system may alert a designated active customer of the availability of a better bid/offer than what was previously available. The alerts may be reported by issue—i.e., any better bid/offer in a particular issue—by side of market (bid or offer)—i.e., by any better bid/offer on a particular side of the market—by price—i.e., the best price available—by current status—i.e., changes in status past a pre-determined delta—or by any other suitable parameter.

FIG. 6 shows yet another aspect of the present invention. This aspect of the invention preferably helps participants quantify and execute a portfolio of bonds in middle market trading system (MMTS)—i.e., a trading system for odd lots of holding of securities. After a customer inputs size, price, and bid/offer wanted, the program returns the value of the portfolio in an easy-to-read dollar value format.

Display 600 includes portions 610 and 620. Portion 610 of FIG. 6 shows the prices that are available for a particular issue in the MMTS. These prices represent available prices—i.e., current bids and offers—for odd lots—i.e., non-standard amounts—of issues. Portion 620 of FIG. 6 shows a customer's portfolio of odd lots of issues. In one embodiment of the invention, a spreadsheet, such as an Excel spreadsheet, may be adapted whereby the customer preferably inputs a target value—either a profit or loss—at which the customer wishes to trade some or all of his portfolio of odd lots of issues. When the spread sheet determines, based on the values obtained from MMTS and the values input by the participant, that the target value of the customer has been achieved, the system may automatically execute the trades necessary to liquidate the portfolio.

For example, even though the average price differential between many of the odd lots and the available bid/offers on MMTS may be large—e.g., 1.1 tics from what the participant desires—the total loss incurred by trading all of the participant's portfolio may be preferably limited because of the relatively small size of the lots. In such a case, it may be highly likely that the customer would execute this odd lot portfolio given the small total value differential. This system preferably obtains advantage as an extremely accurate gauge of the customer odd lot portfolio position.

FIG. 7 shows a display 700 associated with electronic trading of futures contracts for interest-related instruments. FIG. 7 also represents a display that may be used with electronic foreign exchange and/or other suitable items. Display 700 shows a volume (and corresponding prices) of bids 710 and offers 720 for the Chicago Board of Trade 10-year bond futures. On the left are listed bids 710 and on the right are listed offers 720. The price column 730 is shown in the middle. Order type is shown at 740 and may include limit order 742, market order 744 and stop order 746.

Typically, in conventional trading implemented using display 700, participants enter their respective bids and offers by typing the price and volume in field 750. Size fields 752 may be used to facilitate order entry by making pre-programmed size amounts available. Cancel keys 754 may be used to facilitate canceling active orders.

After bids and orders are entered, the bids and offers are matched with suitable contra orders and a trade is then executed by the trading system. Although many of the embodiments of the invention detailed throughout the present application are articulated in a system that is shown in the '580 application, nevertheless these embodiments of the invention are also applicable to a trading system based on display 700.

FIG. 8 shows an order entry dialog box (hereinafter "OEDB") 800 that may be used in a trading system that is commonly referred to as an RFQ (request for quote) trading system.

FIG. 8 illustrates one embodiment of OEDB 800 for submitting an RFQ. OEDB 800 may provide the requesting trader with various options and entry fields. Using some of these options and entry fields, a trader may submit non-RFQ trade commands (i.e., standard trading commands), such as, a bid command, an offer command, a buy command, or a sell command for any suitable instrument. When OEDB 800 is activated, the fields in OEDB 800 are preferably populated with information pertaining to the instrument for which the RFQ is made (the instrument may be selected in any suitable method). For example, the current market price for the instrument may populate the price field.

Numeric keypad 802 may be located at the center of OEDB 800. Numeric keypad 802 may provide buttons for numbers zero through nine, and may contain buttons for numbers ten, twenty-five, fifty, and one hundred or any other suitable or desirable values. The numeric keypad may also contain a plus button ("+"), a minus button ("−"), a decimal point button ("."), a backspace button ("BKS"), and a delete button ("DEL").

OEDB 800 may provide a trader with buy option 804, sell option 806, cancel buys option 808, cancel sells option 810, bid option 812, offer option 814, cancel bids option 816, cancel offers option 818, cancel all bids option 820, cancel all offers option 822, cancel all option 824, cancel all for all instruments option 826, price entry field 828, and size entry field 830.

OEDB 800 may provide an RFQ preference field 844. RFQ preferences field 844 may be made available when the requesting trader selects RFQ option 845 from OEDB 800. Likewise, RFQ preferences field 844 may be removed from OEDB 800 when RFQ option 845 is selected again. Field 844 may provide a trader with RFQ buy option 846, RFQ sell option 848, RFQ BOLS option 850, and RFQ 2-way option 852. RFQ buy option 846 and RFQ sell option 848 provide the requesting trader with the ability to submit an RFQ from a buyer position and an RFQ from a seller position, respectively. Option 850 provides the requesting trader with the ability to specify a bid/offer liquidity spread. Option 852 provides the requesting trader with an opportunity to submit an RFQ without establishing a direction of trade. This will allow the requesting trader to receive a bid price and an offer price from a market participant.

Minimum size field 854, time limit field 856, BOLS field 858, and minimum number of prices field 860 are fields that may be incorporated in RFQ preference field 844. The requesting trader may specify a minimum size for an instrument he or she is willing to buy or sell in field 854. By populating field 856, the requesting trader may specify a time limit as to how long his or her RFQ is open for receiving a quote from a market participant. If the requesting trader desires to specify a bid/offer liquidity spread (BOLS), the requesting trader can specify the BOLS value in field 858 and select option 850. Field 860, when populated, provides the requesting trader with an opportunity to specify the minimum number of quotes to receive from a market participant in response to his or her request.

OEDB 800 may also provide a trade preference field 832. Preference field 832 may be used to indicate the trader's preferred trade type and may allow the requesting trader to select any type of trade that a particular exchange or trading system supports. Although FIG. 8 provides specific examples of trade types (e.g., good-till-canceled (GTC), limit, all-or-none (AON), stop, and market-if-touched (MIT)), the invention may be implemented with any type of trade.

The requesting trader may exercise a guarantee-to-trade (GTT) option in a 2-way RFQ market in which a price parameter and a BOLS parameter is provided. This is a trade type that does not currently exist in the marketplace. GTT may be, for example, an option provided in trade preferences field 832. The GTT status of the 2-way RFQ may be identified to the market participant in order to allow the market participant to be aware of how a trade will be executed if he or she meets the parameters set forth by the requesting trader.

OEDB 800 may also provide an auto-execution feature for an RFQ. The auto-execution feature, when selected, may be used to automatically respond to a market participant's quote. For example, if a quote satisfying the requesting trader's criteria for accepting the quote is received, an accept confirmation may be automatically transmitted from the requesting trader and the trade may be executed. Other various features for managing quotes received in response to an RFQ may be incorporated into OEDB 800.

Options and fields provided in OEDB 800 may be reconfigured to suit any requesting trader's needs and preferences. Configure keypad option 836 may provide the requesting trader with the ability to reconfigure OEDB 800. Close-on-action box 834, when selected, may cause OEDB 800 to be automatically closed after specified actions are performed. Close option 838 allows the requesting trader to close OEDB 800 on demand. In addition, assignable issue buttons field 840 may be provided to allow the requesting trader to have a specific set of instructions executed by the push of a single button. Issue buttons in field 840 may be configured accordingly via assign buttons option 842.

Although some embodiments of the invention detailed throughout the present application are articulated in a system that is shown in the '580 patent, nevertheless, many of these embodiments that are articulated in a system that is shown in the '580 patent are also applicable to a trading system based on display 700, display 800 or other suitable systems.

In some embodiments, an interactive electronic trading system for trading an item between participants is provided. The system may consist of one or more programmed computers that may enable a first participant to enter a bid offer, buy or sell for the item at a select price. In some embodiments, the system may receive a bid, offer, buy or sell entered by a second participant to trade the item at the select price. In some embodiments, the system may execute a trade in accordance with the bid, offer, buy or sell. The system may enable one or more participants to trade additional volume at the select price. In some embodiments, the system preferably will queue a participant that enters a bid, offer, buy or sell to trade at a price other than the select price. In some embodiments of the invention, the system may guarantee the completion of at least a portion of the queued bid, offer, buy or sell at a price no worse than the price of the queued bid, offer, buy or sell. In some embodiments, the system preferably will hold an order that is contra to the queued bid, offer, buy or sell at a price no worse than the price of the queued bid, offer, buy or sell for a period of time. In some embodiments, the system may during the period of time, determine availability of a contra order in the system at a price better than the price of the held contra order. The system may on occurrence of the determination of the available contra order at the better price, match the queued bid, offer, buy or sell with the available better price. On occurrence of the determination of no available contra order at the better price, the system may match the queued bid, offer, buy or sell with the held contra order.

The system may guarantee the completion by displaying a message to the queued participant, the message may comprise of the price of the held contra order and or a confirmation of the completion of at least a portion of the queued bid, offer, buy or sell; and or the size of the guaranteed completion.

The one of more programmed computers that hold the order for a period of time may comprise one or more programmed computers that hold the order that is contra to the queued bid, offer, buy or sell at a price no worse than the price of the queued bid, offer, buy or sell for a predetermined period of time.

The system may comprise one or more programmed computers that on occurrence of the match with the available order with the better price, may display a message to one or more participants, which message may comprise at least one of: the price of the matched contra order; a confirmation of the completion of at least a portion of the queued bid, offer, buy or sell with the better price; the size of the matched contra order; and the price of the queued bid, offer, buy, or sell.

The system may further comprise one or more programmed computers that on occurrence of the match with the held contra order, may display a message to one or more participants, and the message may comprise at least one of: the price of the held contra order; a confirmation of the completion of at least a portion of the queued bid, offer, buy or sell; the size of the matched held contra order; and the price of the queued bid, offer, buy or sell.

The one or more programmed computers that determine availability of a contra order at a price better than the price of the held contra order may comprise one or more programmed computers that determine availability of a contra order during a predetermined period of time.

The one of or more programmed computers that hold for a period of time may comprise one or more programmed computers that cancel the held order during the period of time and concurrently allow a new order to take the place of the cancelled held order and hold the new order for a new period of time.

The one or more programmed computers that cancel the held order may comprise one or more programmed computers that cancel the held order at the request of a participant.

The one or more programmed computers that cancel the held order may comprise one or more programmed computers that cancel the held order upon the determined availability of the contra order at a better price than the price of the held contra order.

The one or more programmed computers that allow the new order may comprise one or more programmed computers that allow the new order to take the place of the cancelled held order and hold the new order for a new predetermined period of time.

The one or more programmed computers that allow the new bid, offer, buy or sell may comprise one or more programmed computers that allow the new bid, offer, buy or sell to take the place of the held bid, offer, buy or sell and hold the new bid, offer, buy or sell instead for a new predetermined period of time. (MS—where the better contra comes in above the held price and the hold is transferred from the original held order—but that order isn't actually cancelled or being queued for cancellation).

The one or more programmed computers that allow the new order may comprise one or more programmed computers that allow the new order to take the place of the cancelled held order and hold the new order for the period of time remaining from the period of time remaining from the cancelled held order.

The one or more programmed computers that allow the new bid, offer, buy or sell may comprise one or more programmed computers that allow the new bid, offer, buy or sell to take the place of the held bid, offer, buy or sell and hold the new bid, offer, buy or sell instead for the period of time remaining from the original held bid (MS—where the better contra comes in above the held price and the hold is transferred from the original held order—but that order isn't actually cancelled or being queued for cancellation).

The one or more programmed computers that determine availability of a contra order in the system may comprise one or more programmed computers that determine availability of a contra order available in the system of one or more programmed computers.

The one or more programmed computers that determine availability of a contra order in the system may comprise one or more programmed computers that determine availability of a contra order accessible by the system of one or more programmed computers.

The one or more programmed computers that hold the order that is contra may comprises one or more programmed computers that hold a plurality of orders, the plurality being contra to the queued bid, offer, by or sell.

The one or more programmed computers that determine availability of a contra order may comprise one or more programmed computers that determine availability of a plurality of contra orders, the plurality being contra to the queued bid, offer, buy or sell.

In some embodiments an interactive electronic trading system for trading an item between participants is provided. The system may consist of one or more programmed computers that may enable a first participant to enter a bid offer, buy or sell for the item at a select price. In some embodiments the system may receive a bid, offer, buy or sell entered by a second participant to trade the item at the select price. The system may guarantee the completion of at least a portion of the bid, offer, buy or sell of the second participant at a price no worse than the select price. In some embodiments the system may hold the bid, offer, buy or sell of the first participant for a period of time. The system may, during the period of time, determine availability of a contra order in the system at a price better than the price of the held bid, offer, buy, or sell. In some embodiments the system may, on occurrence of the determination of the available contra order at the better price, match the bid, offer, buy or sell of the second participant with the available contra order with the better price. The system may, on occurrence of the determination of no available contra order at the better price, match the bid, offer, buy or sell of the second participant with the held bid, offer, buy or sell of the first participant.

The one or more programmed computers that guarantee the completion may comprise one or more programmed computers that may display a message to the second participant, the message comprising at least one of the price of the held bid, offer, buy or sell of the first participant; a confirmation of the completion of at least a portion of the bid, offer, buy or sell of the first participant; and the size of the guaranteed completion.

The one of more programmed computers that hold for a period of time may comprise one or more programmed computers that hold the bid, offer, buy or sell of the first participant at a price no worse than the price of the bid, offer, buy or sell of the second participant for a predetermined period of time.

The system may further comprise one or more programmed computers that on occurrence of the match with the available contra order with the better price, may display a message to one or more participants, the message comprising at least one of: the price of the matched contra order; a confirmation of the completion of at least a portion of the bid, offer, buy or sell of the second participant with the better price; the size of the matched contra order; and the price of the bid, offer, buy or sell of the second participant.

The system may further comprise one or more programmed computers that on occurrence of the match with the held bid, offer, buy or sell, may display a message to one or more participants, the message comprising at least one of: the price of the held bid, offer, buy or sell; a confirmation of the completion of at least a portion of the bid, offer, buy or sell of the second participant; the size of the matched held bid, offer, buy or sell; and the price of the bid, offer, buy or sell of the second participant.

The one or more programmed computers that determine availability of a contra order at a price better than the price of the held bid, offer, buy or sale may comprise one or more programmed computers that determine availability of a contra order during a predetermined period of time.

The one of or more programmed computers that hold for a period of time may comprise one or more programmed computers that cancel the held bid, offer, buy or sell during the period of time and concurrently allow a new bid, offer, buy, or sell to take the place of the cancelled held bid, offer, buy or sell and hold the new bid, offer, buy or sell for a new period of time.

The one or more programmed computers that cancel the held bid, offer, buy or sell may comprise one or more programmed computers that cancel the held bid, offer, buy or sell at the request of a participant.

The one or more programmed computers that cancel the held bid, offer, buy or sell may comprise one or more programmed computers that cancel the held bid, offer, buy or sell upon the determined availability of the contra bid, offer, buy or sell at a better price than the price of the held contra bid, offer, buy or sell.

The one or more programmed computers that allow the new bid, offer, buy or sell may comprise one or more programmed computers that allow the new bid, offer, buy or sell to take the place of the cancelled held bid, offer, buy or sell and hold the new bid, offer, buy or sell for a new predetermined period of time.

The one or more programmed computers that allow the new bid, offer, buy or sell may comprise one or more programmed computers that allow the new bid, offer, buy or sell to take the place of the held bid, offer, buy or sell and hold the new bid, offer, buy or sell instead for a new predetermined period of time. (MS—where the better contra comes in above the held price and the hold is transferred from the original held order—but that order isn't actually cancelled or being queued for cancellation).

The one or more programmed computers that allow the new bid, offer, buy or sell may comprise allow the new bid, offer, buy or sell to take the place of the cancelled held bid, offer, buy or sell and hold the new bid, offer, buy or sell for the period of time remaining from the period of time remaining from the cancelled held bid, offer, buy or sell.

The one or more programmed computers that allow the new bid, offer, buy or sell may comprise one or more programmed computers that allow the new bid, offer, buy or sell to take the place of the held bid, offer, buy or sell and hold the new bid, offer, buy or sell instead for the period of time remaining from the original held bid (MS—where the better contra comes in above the held price and the hold is transferred from the original held order—but that order isn't actually cancelled or being queued for cancellation).

The one or more programmed computers that determine availability of a contra order in the system may comprise one or more programmed computers that determine availability of a contra order available in the system of one or more programmed computers.

The one or more programmed computers that determine availability of a contra order in the system may comprise one or more programmed computers that determine availability of a contra order accessible by the system of one or more programmed computers.

The one or more programmed computers that hold the bid, offer, buy or sell that is contra may comprise one or more programmed computers that hold a plurality of bids, offers, buys or sells, the plurality being contra to the bid, offer, buy or sell of the first participant.

Yet another embodiment of the invention includes a system for trading an item between participants. The system includes a first plurality of workstations that receives bids or offers for the item at prices and volumes, a second plurality of workstations that receives a command to trade a volume of the item at a select price; and a programmed computer, coupled to the workstations. The programmed computer preferably (1) enables the participants to participate by entering the bids or offers with respect to the item and that, in response to the command, (2) executes a trade transaction in accordance with the command at the select price and (3) communicates a computer readable message to one of the workstations. Preferably, the computer readable message indicates that a bid or offer is available to be acted upon by the workstation after a period of time. The message may indicates the magnitude of the period of time. Alternatively, the computer readable message may indicate that a bid or offer is available to be acted upon exclusively by the workstation for a period of time.

It will be understood that the foregoing is only illustrative of the principles of the invention, and that various modifications can be made by those skilled in the art without departing from the scope and spirit of the invention.

What is claimed is:

1. An electronic trading system comprising:
   at least one processor configured to control:
   executing a first trade between a first party on a first side of the first trade and a first counterparty on a second side of the first trade, in which the first trade is for a first volume of an item and at a first price;
   in response to executing the first trade, providing the first party with a period of exclusivity for trading in the item at the first price on the first side of the first trade, in which providing the period of exclusivity includes restricting matching of at least one order for another trade on the first side of the first trade from at least one other party during the period of exclusivity;
   while the period of exclusivity is in effect:
   accepting, over a communication network, first trading commands from computer devices of respective excluded parties requesting trades in the item at prices less favorable than the first price of the first trade,
   automatically responsive to accepting the first trading commands, causing the electronic trading system to enter into a guarantee state in which the at least one processor does not, while the period of exclusivity is in effect, enable cancelation, over the communication network, of:
   the first trading commands by the excluded parties, and
   second trading commands requesting trades in the item at the prices less favorable than the first price of the first trade from contraparties to the excluded parties, in which the first trading commands are for a different side of a given trade than the second trading commands;
   determining, that the first party has additional volume for trading on the first side of the first trade beyond a given volume of the first counterparty for trading on the second side of the first trade; and
   in response to an end of the period of exclusivity and determining that the first party has the additional volume for trading on the first side of the trade, determining matches with the additional volume and second orders that are for the second side of the first trade in a price and time priority.

2. The system of claim 1, in which the at least one processor is configured to control:
   allowing cancelation of unmatched portions of the second orders remaining after determining the matches with the additional volume and the second orders.

3. The system of claim 1, in which the at least one processor is configured to control:
   automatically responsive to accepting the first trading commands, executing, over the communication network, trades on the first trading commands; and
   preventing cancelation of the second orders provided, over the communication network, from respective second computer devices that are for the second side of the first trade from parties other than the first counterparty.

4. The system of claim 1, in which the second orders are orders for one or more prices that are more advantageous for the first party than the first price.

5. The system of claim 1, in which the first party includes a buyer and the first counterparty includes a seller.

6. The system of claim 1, in which the period of exclusivity includes a period of four seconds.

7. The system of claim 1, in which the at least one processor is configured to control:
   during the period of exclusivity, over the communication network, accepting orders for the item on the first side of the first trade at the first price from the first party and accepting orders for the item on the second side of the first trade at the first price from the first counterparty.

8. The system of claim 1, in which the at least one processor is configured to control:
   dynamically adjusting an amount of time of the period of exclusivity based on changing market conditions.

9. The system of claim 1, in which the at least one processor is configured to control:
   in response to determining the matches, preventing cancellation of the additional volume by the first party.

10. The system of claim 1, wherein:
    the first trade is initiated as a result of a hit or lift by the first party.

11. The system of claim 1, wherein:
    the first trade is initiated as a result of automatic matching between passive orders.

* * * * *